Figure 1:
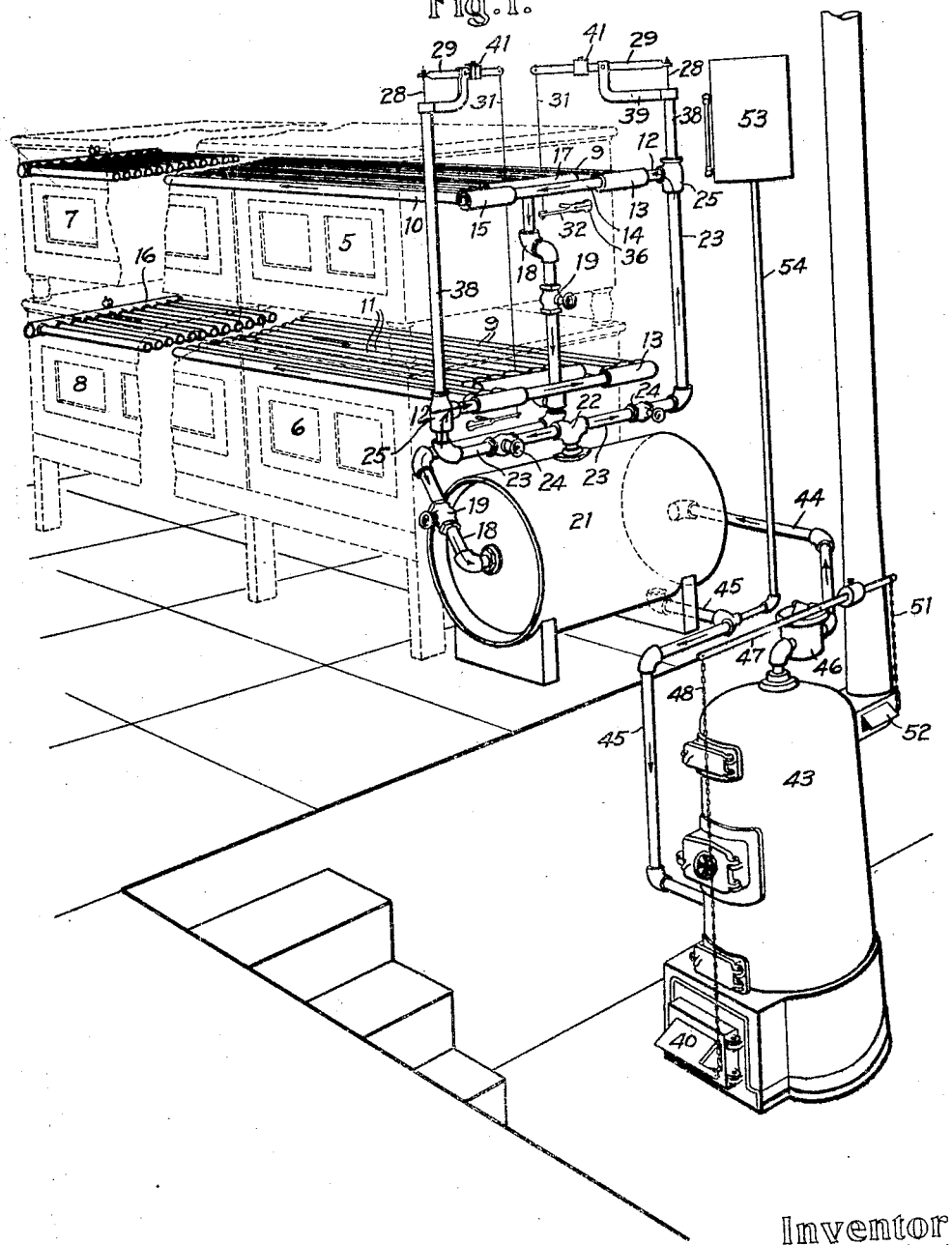

C. E. ADAIR.
HEATING SYSTEM FOR INCUBATORS.
APPLICATION FILED JAN. 11, 1911.

Patented Oct. 29, 1912.
2 SHEETS—SHEET 1.

Witnesses:

Inventor:
Charles E. Adair
by his attorneys
Osgood, Davis & Dorsey

C. E. ADAIR.
HEATING SYSTEM FOR INCUBATORS.
APPLICATION FILED JAN. 11, 1911.
1,042,635.
Patented Oct. 29, 1912.
2 SHEETS—SHEET 2.
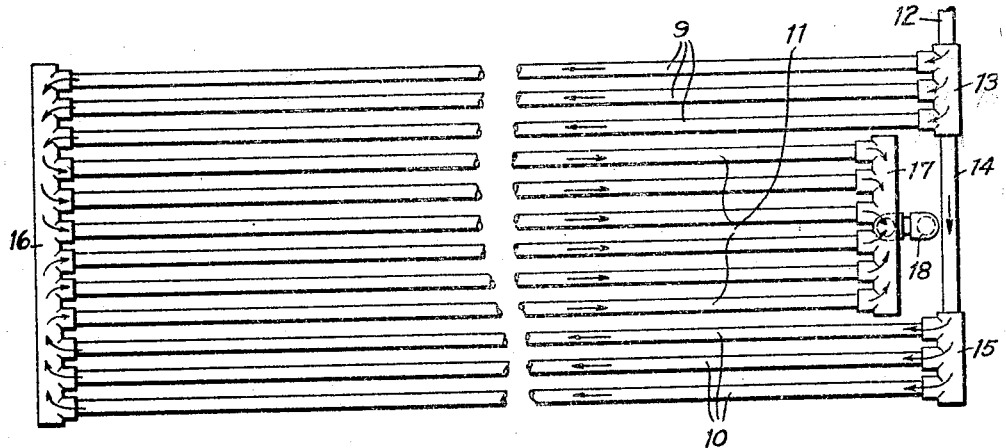
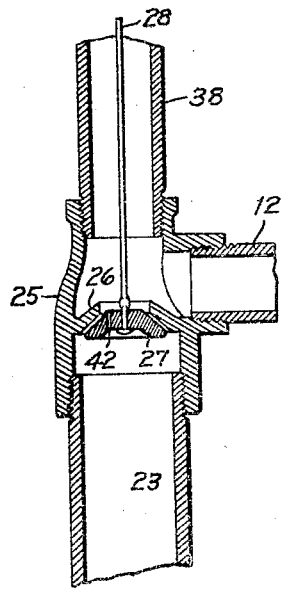
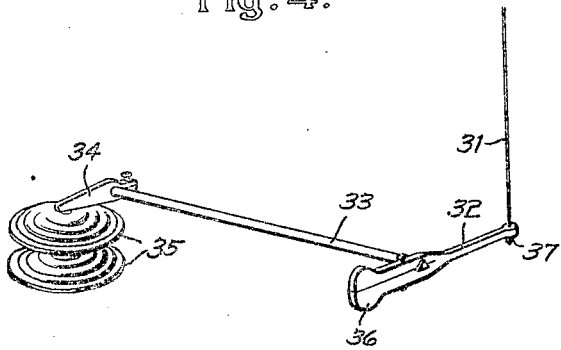
Witnesses:
L. Thow
Clarence W. Carroll
Inventor:
Charles E. Adair
by his attorneys
Osgood, Davis & Dorsey

UNITED STATES PATENT OFFICE.

CHARLES E. ADAIR, OF BUFFALO, NEW YORK, ASSIGNOR TO CYPHERS INCUBATOR COMPANY, OF BUFFALO, NEW YORK, A CORPORATION OF NEW YORK.

HEATING SYSTEM FOR INCUBATORS.

1,042,635.  Specification of Letters Patent.  Patented Oct. 29, 1912.

Application filed January 11, 1911. Serial No. 602,124.

*To all whom it may concern:*

Be it known that I, CHARLES E. ADAIR, a citizen of the United States, and resident of Buffalo, in the county of Erie and State of New York, have invented certain new and useful Improvements in Heating Systems for Incubators, of which the following is a specification.

This invention relates particularly to heating-systems for incubator-plants in which a circulating fluid heating medium, such as hot water, is employed, and in which the heat for a large number of incubators is derived from a single heater or boiler.

In systems of the kind referred to it has heretofore been the practice to connect the radiating-pipes, or other heat-radiating devices, directly in circuit with the heater through suitable feed-pipes and return-pipes, the flow of the hot water through the circuit being produced by thermo-siphon action, and the temperature of the incubators being regulated by controlling the rate of flow of the heating-fluid in each incubator through the operation of a thermostatic device.

The object of the present invention is to improve systems of the type in question in such a manner as to simplify the automatic control of the heat, while at the same time securing a complete uniformity in the heating of the incubators, and particularly to guard against deficient heating due to sudden falls in the temperature of the atmosphere or to temporary inattention on the part of the operator of the heater.

To the end of guarding against sudden drops in atmospheric temperature, or against any temporary failure of the heater to meet the demands upon it, I employ an arrangement in which the radiating means are not connected directly in circuit with the heater in the usual manner, but in which they are supplied from, and arranged in circuit with, a reservoir of considerable capacity in which a large volume of heated fluid is stored. The fluid in this reservoir is heated by means of a heater of ordinary construction, which is connected in circuit with the reservoir by suitable feed and return-pipes, but the flow of heating-fluid through the incubators is entirely independent of the flow of fluid through the heater. Owing to this arrangement there is always on hand a sufficient volume of heated fluid to maintain the necessary temperature in the incubators for a considerable period of time, however the demand may be increased owing to a sudden fall in atmospheric temperature, and independently of any temporary failure on the part of the heater due to lack of attention or failure of fuel. This arrangement is of particular utility in operating the incubators at night, for it is customary to attend to the fire in the heater in the evening and then leave the system to operate automatically through the night. As sudden and considerable drops in atmospheric temperature are likely to occur at night, and as the fire is not attended to for long periods at this time, the heat-storing capacity of the present system prevents undue drop in the temperature of the incubators, which is otherwise liable to occur at such times and to entail great loss through the chilling of the eggs.

Other objects and features of the invention will be more particularly set forth in connection with the following description of the illustrated embodiment of the invention.

In the accompanying drawings: Figure 1 is a perspective drawing of a complete heating-system embodying the present invention; Fig. 2 is a plan-view showing the arrangement of the radiating pipes in the incubators; Fig. 3 is a vertical section through one of the thermostatically-operated circulation-controlling valves; and Fig. 4 is a perspective view of the thermostatic mechanism by which the circulation-controlling valve is actuated.

The illustrated embodiment of the invention is a heating-system adapted to employ water as a heating-fluid. In Fig. 1 the casings of the incubators are indicated in dotted lines, two tiers of incubators being shown. The first two incubators 5 and 6, which are hereinafter designated as the "master incubators", and the last two incubators 7 and 8 of the series are shown, while it will be understood that between these first and last incubators the series may include any convenient number, as indicated by broken lines in the drawing.

The radiating-pipes are arranged longitudinally throughout the tiers of incubators, and are located close to the tops of the incubator-casings. The outgoing pipes in each tier are arranged in two groups 9 and 10 of three pipes each, while the return pipes 11 are arranged in a single group of six pipes located between the outgoing pipes and in the same plane. The outgoing pipes 9 are supplied with hot water through a feed-pipe 12 connected with them by a manifold 13, and the outgoing pipes 10 are supplied through a branch 14 from the manifold 13, which is connected with the pipes 10 by a manifold 15. At their distant ends all of the outgoing pipes are connected by a manifold 16, which discharges the water from the outgoing pipes into the far ends of the return-pipes. The inner ends of the return-pipes are connected by a manifold 17, which discharges into a common return-pipe 18. The return-pipe 18 is provided with hand-valves 19 by which the flow may be interrupted or regulated when necessary. It will be apparent that since the outgoing radiating-pipes are similar in number and size to the return radiating-pipes, they have equal radiating surfaces therewith, and in each incubator the same holds true. For this reason the heating effect upon all the incubators is similar, notwithstanding the gradual fall in temperature in the heating-fluid between the feed-pipe 12 and the return-pipe 18. This is due to the fact that where the temperature of the heating-fluid in the outgoing radiating-pipes is highest, the temperature of the fluid in the corresponding portions of the return radiating-pipes is lowest, so that the same average effect is produced throughout the extent of the pipes for any transverse section thereof. It will be further apparent that as the outgoing pipes are arranged outside of the return-pipes, and as the temperature of the water is higher in the outgoing pipes, the greatest heating effect is produced in each incubator adjacent the front and rear walls thereof, and therefore at the points where the greatest heat is required to counteract the radiation through the walls. By this arrangement, therefore, I secure a fairly uniform distribution of heat above the whole surface of the egg-trays in each incubator.

The hot water which circulates through the pipe-system just described is derived from a reservoir of considerable capacity in the form of a cylindrical tank 21. The hot water issues from this tank through a T 22, and passes thence through two feed-pipes 23 which are controlled by hand-valves 24, and the feed-pipes 23 supply hot water to the feed-pipes 12 of the upper and lower tiers of heating-pipes. Owing to the equalized action of the radiating-pipes throughout the series of incubators it is not necessary to provide independent thermostatic control of the flow of water in each incubator, but the entire system can be accurately controlled by means of single thermostatic devices located in the master-incubators 5 and 6. To this end each feed-pipe is provided with a flow-controlling-valve 25, of which the construction is illustrated particularly in Fig. 3. This valve is provided with a casing connected with the feed-pipes 23 and 12, and with a conical valve-seat 26. A conical valve 27 coöperates with the valve-seat, and this valve is supported by a rod 28 of which the upper end is connected to one end of a lever 29. The other end of the lever is connected to a rod 31, of which the lower end is connected to a lever-arm 32 fixed on a rock-shaft 33. The rock-shaft is journaled in the end-wall of the master-incubator, and at its inner end is provided with an arm 34 which rests upon a thermostatic device 35 located within the incubator. This thermostatic device may be of any ordinary or suitable form, but is illustrated as of the type comprising corrugated double diaphragms inclosing ether, or other volatile fluid. As the temperature in the master-incubator rises, the fluid in the thermostat expands, thereby expanding the diaphragms and raising the arm 34. This results in rocking the rock-shaft 33, thereby causing the arm 32 to draw down the rod 31, and, through the action of the lever 29 and the rod 28, the valve 27 is raised toward the valve-seat 26 so as to reduce the flow of water through the feed-pipes.

The lever-arm 32 is provided with a counterweight 36 to maintain the arm 34 in engagement with the thermostat, and the rod 31 is connected with the arm 32 by an adjustable nut 37 which provides for adjustment of the mechanism according to the temperature desired in the incubators. To avoid the use of a stuffing-box, where the rod 28 emerges from the valve-casing, the rod is carried upward through a stand-pipe 38 of which the upper end is above the water-level in the heating-system. This stand-pipe provides a convenient support for a bracket 39 upon which the lever 29 is pivoted. As a further means for adjusting the operation of the thermostatic mechanism, the lever 29 is provided with a sliding counterweight 41. It will be apparent that, through the operation of the arrangement just described, the flow of water throughout the series of incubators is controlled in accordance with the temperature in the master-incubator, and, as already stated, the result is to produce a uniform temperature throughout all of the incubators of the series and to preserve this temperature approximately at a predetermined degree so long as the temperature of the hot water in the reservoir 21 is substantially above such degree.

To prevent the entire cessation of flow in the radiating-circuit in case the valve 27 is moved to its extreme upward position and into engagement with its seat, a small vent 42 is provided in the valve, this vent being sufficient to permit a slight flow of water whereby the thermo-siphon action may be preserved.

The heater 43 illustrated in Fig. 1 may be of any ordinary or suitable form. It is connected with the reservoir 21 by means of a feed-pipe 44 and a return-pipe 45, the heater, the reservoir, and the pipes 44 and 45 constituting a complete circuit independent of the incubator-heating circuit heretofore described. Whenever the heater is operating the water may flow freely through this circuit regardless of the action of the thermostatic controlling-valves 25 and of the degree to which the water is flowing through the radiating-circuit, and thus the heater tends constantly to maintain the water in the reservoir at a predetermined maximum temperature. The operation of the heater is controlled by means of a thermostatic damper-controller 46 which is connected with the feed-pipe 44. As the construction and use of devices of this character are well known the construction of the damper-controller is not completely illustrated, but it is provided with the usual lever 47, one end of which is connected, by means of a chain 48, with the draft-door 40 of the heater, while the other end is connected, by means of a chain 51, with the damper 52 of the heater. This draft-controller operates in the usual manner to check the fire in the heater when the temperature of the water in the feed-pipe 44 rises to a predetermined degree.

The return-pipe 45 is connected, through a pipe 54, with the usual expansion-chamber 53 to provide for variations in the volume of the water.

It will be apparent from the foregoing description that in case the fire in the heater should go out, or become so low as not effectively to heat the water, the flow of water through the heating circuit comprising the heater and the pipes 44 and 45 would cease. The hot water would still continue to flow, however, through the radiating-circuit in the incubators, subject to the control of the thermostatic valves, and owing to the considerable volume of hot water contained in the reservoir, this flow may continue and the temperature of the incubators may be suitably maintained for a considerable period of time, sufficient in practice to maintain the proper operation of the incubators until the fire in the heater is replenished. On the other hand, in case the flow of hot water through the radiating-circuit be considerably reduced, or practically interrupted, by the thermostatic valves, or by means of the hand-valves 19 or 24, the heater may still continue to heat the water in the reservoir and to maintain it at the predetermined maximum ready for such demands as may be made upon the system. An elastic system is thus provided in which the periods of maximum activity of the heater do not necessarily correspond to the periods of maximum demand in the incubators, and thus the labor and expense of attendance upon the heater and the incubators is substantially reduced, while at the same time a heater of comparatively small capacity may be employed since the reservoir provides temporarily for a greater output of heat than can be supplied immediately by the heater.

While in the description and in the following claim I have referred to the heating-fluid as water, and while this is the fluid most commonly employed for this purpose, it will be obvious that the invention is not limited to the use of water for this purpose, but that other fluids may be employed in connection with the novel arrangement of parts hereinbefore described.

My invention is not limited to the details of construction and operation of the illustrated embodiment thereof, but may be embodied in various forms within the nature of the invention as it is defined in the following claim.

I claim:—

In combination with a series of incubators, a heating-system therefor comprising a water-heater; a hot-water reservoir of substantial capacity; inlet- and outlet- connections between the reservoir and the heater whereby a heating-circuit is established through the reservoir and the heater; radiating means for heating the incubators; inlet- and outlet-connections between said means and the reservoir, and independent of the connections between the reservoir and the heater, whereby a radiating-circuit is established through the radiating means entirely independent of the heating-circuit; thermostatic means for controlling the flow of water through the radiating-circuit, said means being subject to the temperature of the incubators and adapted to maintain a predetermined temperature in the incubators; and thermostatic means for controlling the fire in the heater, said means being subject to the temperature of the water in the heating-circuit and adapted to maintain, in said circuit, a predetermined temperature higher than that of the incubators.

CHARLES E. ADAIR.

Witnesses:
 M. C. ISLER,
 A. MUTH.